United States Patent
Tsukimoto et al.

(10) Patent No.: US 6,989,624 B2
(45) Date of Patent: Jan. 24, 2006

(54) VIBRATION ELEMENT AND VIBRATION WAVE DRIVING APPARATUS

(75) Inventors: Takayuki Tsukimoto, Kanagawa (JP); Yutaka Maruyama, Tokyo (JP); Kiyoshi Nitto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/952,762

(22) Filed: Sep. 30, 2004

(65) Prior Publication Data

US 2005/0040732 A1 Feb. 24, 2005

Related U.S. Application Data

(63) Continuation of application No. 10/044,936, filed on Jan. 15, 2002.

(30) Foreign Application Priority Data

| Jan. 22, 2001 | (JP) | ................................ 2001-013366 |
| Jan. 11, 2002 | (JP) | ................................ 2002-004196 |
| Jan. 11, 2002 | (JP) | ................................ 2002-004197 |

(51) Int. Cl.
  *H01L 41/08* (2006.01)

(52) U.S. Cl. .......................... 310/323.12; 310/323.16
(58) Field of Classification Search ............ 310/323.02, 310/323.12, 323.16, 328, 325
  See application file for complete search history.

(56) References Cited

U.S. PATENT DOCUMENTS

| 4,678,956 A | 7/1987 | Izukawa et al. ............ 310/323 |
| 4,692,650 A | 9/1987 | Okumura et al. ........... 310/323 |
| 4,692,651 A | 9/1987 | Hiramatsu et al. .......... 310/232 |
| 4,752,711 A | 6/1988 | Tsukimoto et al. ....... 354/195.1 |
| 4,763,148 A | 8/1988 | Tsukimoto et al. ......... 318/128 |
| 4,764,702 A | 8/1988 | Mishiro ................ 310/323.12 |
| 4,810,923 A | 3/1989 | Tsukimoto et al. ......... 310/323 |
| 5,004,964 A | 4/1991 | Kataoka et al. ............. 318/128 |
| 5,051,647 A | 9/1991 | Uchikawa et al. ..... 310/323.12 |
| 5,115,161 A | 5/1992 | Myohga et al. ........ 310/323.15 |
| 5,162,692 A | 11/1992 | Fujimura ............... 310/323.15 |
| 5,274,295 A | 12/1993 | Tsukimoto et al. ......... 310/323 |
| 5,298,829 A | 3/1994 | Tsukimoto et al. ......... 310/323 |
| 5,300,850 A | 4/1994 | Okumura et al. ........... 310/323 |

(Continued)

FOREIGN PATENT DOCUMENTS

| EP | 1 039 558 A1 | 9/2000 |
| JP | 4-91668 | 3/1992 |
| JP | 4-91670 | 3/1992 |
| JP | 4-91671 | 3/1992 |
| JP | 6-178561 | 6/1994 |
| JP | 7-194148 | 7/1995 |
| JP | 2000-262077 | 9/2000 |
| JP | 2001-145376 | 5/2001 |

*Primary Examiner*—Mark Budd
(74) *Attorney, Agent, or Firm*—Fitzpatrick, Cella, Harper & Scinto

(57) ABSTRACT

The present invention relates to a vibration wave driving apparatus includes a vibration element having an electromechanical energy conversion element that is disposed between a first elastic member and a second elastic member, characterized in that the vibration element can have a plurality of vibration modes which are different in relative displacement ration between respective ends of the vibration element. Specifically, a third elastic member is disposed between the first elastic member and the second elastic member, and the vibration element is allowed to have two portions which are different in dynamic stiffness from each other and are arranged in the axial direction thereof with the third elastic member interposed therebetween. According to this structure, the length of the vibration wave driving apparatus in the axial direction can be reduced and internal loss of vibration energy can be suppressed to be small.

1 Claim, 9 Drawing Sheets

U.S. PATENT DOCUMENTS

| | | | |
|---|---|---|---|
| 5,359,251 A | 10/1994 | Tsukimoto et al. | 310/323 |
| 5,387,835 A | 2/1995 | Tsukimoto et al. | 310/323 |
| 5,436,522 A | 7/1995 | Tsukimoto et al. | 310/323 |
| 5,448,128 A | 9/1995 | Endo et al. | 310/323.12 |
| 5,585,685 A | 12/1996 | Maeno et al. | 310/323 |
| 5,594,291 A | 1/1997 | Tamai et al. | 310/323 |
| 5,646,469 A | 7/1997 | Tsukimoto et al. | 310/323 |
| 5,698,929 A | 12/1997 | Seki et al. | 310/323 |
| 5,726,515 A | 3/1998 | Tsukimoto et al. | 310/323.12 |
| 5,770,916 A | 6/1998 | Ezaki et al. | 310/366 |
| 5,917,269 A | 6/1999 | Maruyama et al. | 310/323 |
| 5,917,270 A | 6/1999 | Tsukimoto et al. | 310/323.12 |
| 5,949,178 A | 9/1999 | Tamai et al. | 310/323 |
| 5,952,766 A | 9/1999 | Mukohjima et al. | 310/323.04 |
| 6,018,213 A | 1/2000 | Yano | 310/323.12 |
| 6,046,526 A | 4/2000 | Maruyama | 310/323.06 |
| 6,051,911 A | 4/2000 | Kojima et al. | 310/323 |
| 6,191,520 B1 | 2/2001 | Maruyama et al. | 310/323.06 |
| 6,198,202 B1 | 3/2001 | Tamai et al. | 310/323.15 |

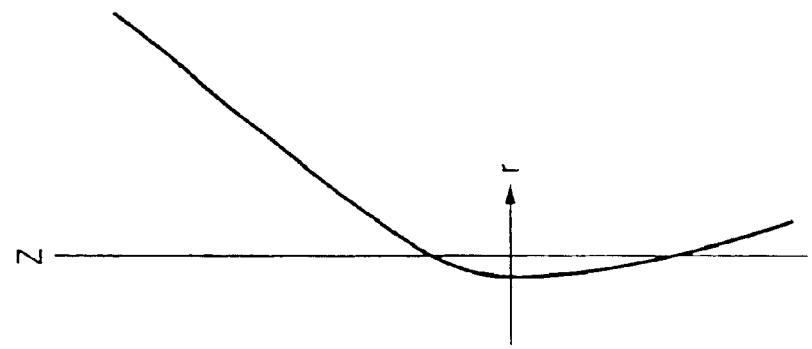
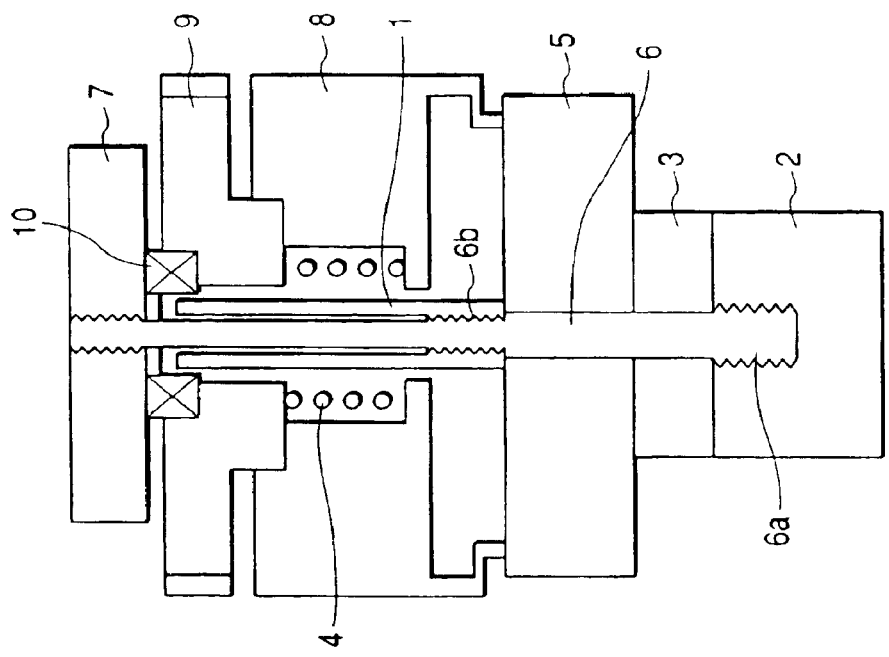

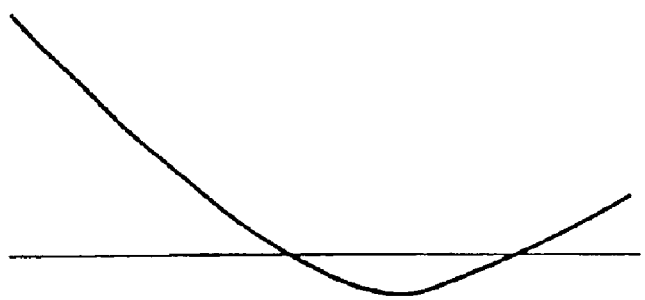
FIG. 2B  FIG. 2C
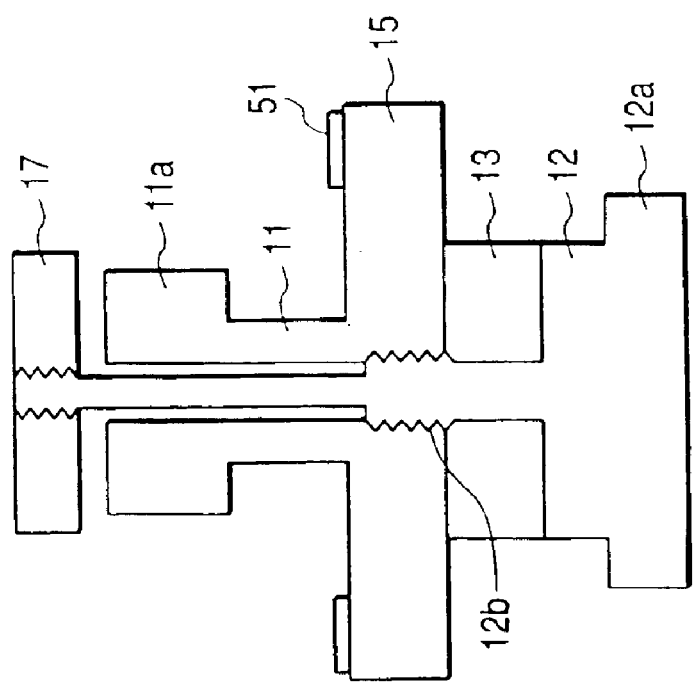
FIG. 2A

VIBRATION ELEMENT AND VIBRATION WAVE DRIVING APPARATUS

This application is a continuation of application Ser. No. 10/044,936 filed Jan. 15, 2002.

BACKGROUND OF THE INVENTION

1. Field of the Invention

The present invention generally relates to a vibration wave driving apparatus, and more particularly, to a configuration of a vibration element used in a bar-shaped vibration wave driving apparatus.

2. Related Background Art

A bar-shaped vibration wave driving apparatus includes, as a basic structure, a vibration element composed of elastic members made of metal or the like and a piezoelectric element as an electro-mechanical energy conversion element. The bar-shaped vibration wave driving apparatus generates a driving vibration such as a traveling wave or the like through application of an alternating voltage as an alternating signal with different phases to the piezoelectric element.

A contact member is brought into pressure contact with a driving part of the elastic member by a pressurizing means and the contact member is frictionally driven by the driving vibration generated in the driving part of the elastic member to allow the vibration element and the contact member to be moved relative to each other.

There is a vibration wave motor as an example of such a vibration wave driving apparatus in which a vibration element is used as a stator and a contact member as a rotor.

Examples of the vibration element of the vibration wave motor include those with a configuration in which a ring-shaped piezoelectric element plate is attached to one surface of a ring- or disc-shaped elastic member and those of a type in which the rotation of the rotor is taken out through an output shaft or of a type in which the rotation of the rotor is taken out directly.

Such a vibration wave motor has been applied to products to be used for driving a camera lens and the like. There are annular type and bar-shaped type vibration wave motors.

FIG. 11A is a structural view of a bar-shaped vibration element of a bar-shaped vibration wave motor used for driving a camera lens. FIG. 11B shows a vibration mode (with the z-axis assigned to the axial direction and the r-axis assigned to the radial direction) in an axis part of the bar-shaped vibration element.

Numeral 101 indicates a first elastic member; numeral 102, a second elastic member; and numeral 103, a piezoelectric element. Numeral 106 denotes a shaft member passing through the first elastic member 101, the piezoelectric element 103, and the second elastic member 102. One end of the shaft member 106 located on the side of a rotor 108 is fixed to a fitting member 107 to be attached to a product and the other end is fixed to a nut 115. A threaded portion is formed in the other end of the shaft member 106. With the nut 115 tightened, the first elastic member 101, the piezoelectric element 103, and the second elastic member 102 disposed between a flange portion provided for the shaft member 106 and the nut 115 are sandwiched and fixed therebetween. Numeral 108 indicates the rotor as described above, and numeral 116 denotes a friction member fixed to the first elastic element 101 to be in contact with the rotor.

When a driving signal is applied to the piezoelectric element 103, the bending vibration indicated in FIG. 11B is excited in the bar-shaped vibration element and thereby the bar-shaped vibration element makes a swing movement substantially about the z-axis. Accordingly, the friction member 116 makes a circular motion around the z-axis.

It seems that the vibration element of such a bar-shaped vibration wave driving apparatus has been reduced in size in its radial direction, but there is still room for reduction in size in its thrust direction, i.e. in length of its axis.

However, when the vibration element is simply shortened, there arise problems that the resonance frequency increases and the vibration displacement is reduced, which causes the deterioration in efficiency of friction drive, the increase in price of a driving circuit element due to the high frequency, or the increase in loss inside the element.

Hence, Japanese Patent Application Laid-open No. 4-91668 proposes one in which a vibration element is provided with a smaller diameter portion to reduce the resonance frequency. According to this proposal, however, when the vibration element is simply made thinner to lower the resonance frequency, the diameters of a piezoelectric element and a frictional surface also are reduced and thereby generating force of the piezoelectric element and the friction torque also decrease.

As a technique for shortening the axis of a bar-shaped vibration wave driving apparatus, for solving such matter, there is one disclosed in Japanese Patent Application Laid-open No. 2001-145376, which is shown in FIG. 12.

A vibration apparatus in such document is identical to a conventional product in that a piezoelectric element 203 is sandwiched and fixed between a first elastic member 201 and a second elastic member 202. However, the apparatus is different from the conventional product in that the first elastic member 201 with a frictional surface is divided into two regions including an inner peripheral portion and an outer peripheral portion that are connected to each other through a thin connection part 210.

According to this structure, even if the axis of the bar-shaped elastic member is shortened, a low resonance frequency can be obtained since the first elastic member has a sufficiently high mass.

According to this technique, however, when the connection part 210 is made thinner to allow the resonance frequency to be lowered and thereby its stiffness is deteriorated, the displacement generated in the piezoelectric element is absorbed by a soft spring of the connection part 210. Consequently, it is difficult to transmit the driving force to a rotor efficiently. On the contrary, when the connection part 210 is made thick, the resonance frequency cannot be reduced effectively. Thus, it seems that there is still room for further improvement.

SUMMARY OF THE INVENTION

One aspect of this invention is to provide a vibration wave driving apparatus including a vibration element having an electro-mechanical energy conversion element that is disposed between a first elastic member and a second elastic member, in which the vibration element can have a plurality of vibration modes which are different in relative ratio between displacements of respective ends of the vibration element. Specifically, a third elastic member is disposed between the first elastic member and the second elastic member, and the vibration element is allowed to have two portions which are different in dynamic stiffness from each other and are arranged in the axial direction with the third elastic member interposed therebetween. According to this structure, the length in the axial direction of the vibration wave driving apparatus can be reduced and the internal loss of vibration energy can be suppressed to be small.

BRIEF DESCRIPTION OF THE DRAWINGS

FIG. 1A is a cross-sectional view of a vibration wave motor showing a first embodiment of the present invention, and FIGS. 1B and 1C each show a vibration mode of its vibration element;

FIG. 2A is a cross-sectional view of a vibration element showing a second embodiment of the present invention, and FIGS. 2B and 2C each show a vibration mode of the vibration element;

DETAILED DESCRIPTION OF THE PREFERRED EMBODIMENTS

First Embodiment

Figure 3:
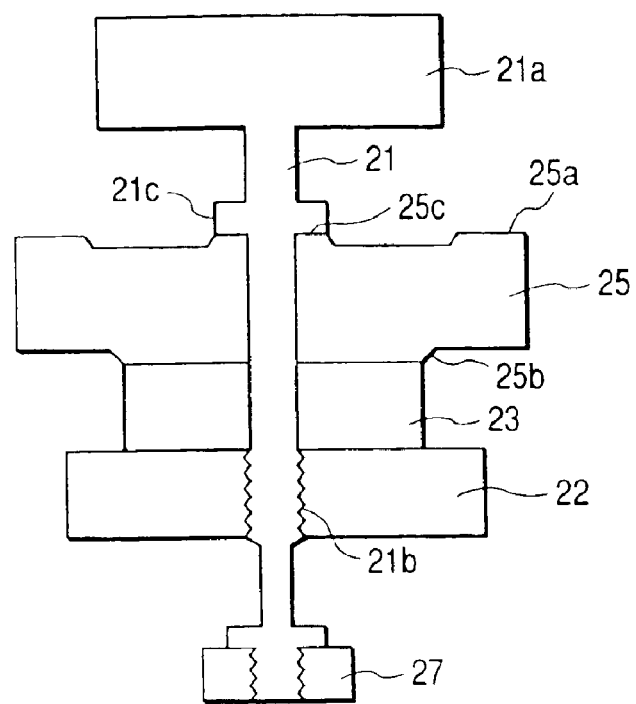
FIG. 3 is a cross-sectional view of a vibration element according to a third embodiment of the present invention.

The problem of the invention described in Japanese Patent Application Laid-open No. 2001-145376 is caused because the mass member attached to an end of a soft spring (connection part 210) serves as a frictional surface. Hence, it is conceivable that this problem can be solved through separation of a functional member for lowering the resonance frequency and a functional member for taking out driving force from each other.

FIGS. 1A to 1C show a first embodiment of the present invention; FIG. 1A is a cross-sectional view of a vibration wave motor and FIGS. 1B and 1C show bending vibration modes of its vibration element.

Numeral 1 indicates a first elastic member with a hollow cylindrical shape that is made of a material with a low vibration damping loss such as brass. Numeral 2 denotes a second elastic member with a cylindrical shape that is also made of a material with a low vibration damping loss as in the case of the first elastic member 1. Numeral 5 indicates a flange-shaped (disc-shaped) elastic member extending in the direction orthogonal to the axial direction of the vibration element. The first elastic member 1, the second elastic member 2, and the flange-shaped elastic member 5 are fixed together by a shaft 6 including threaded portions 6a and 6b. This flange-shaped elastic member 5, which is formed of a material with high abrasion resistance, is in contact with a rotor 8 by a portion in the vicinity of its outer periphery of its one surface, and rotates and drives the rotor 8. As is apparent from FIG. 1A, a frictional surface of the flange-shaped elastic member 5 that is in contact with the rotor 8 is located on the outer side with respect to the outer peripheries of the first elastic member 1 and the piezoelectric element 3 that are adjacent to the flange-shaped elastic member 5. The shaft 6 is fixed to a mass member 7 to be attached to an unshown device by its one end portion and functions as a support pin for supporting the vibration element. The portion of the shaft that is not located inside the second elastic member 2, the piezoelectric element 3, and the flange-shaped elastic member 5 is formed to be sufficiently thin. Thus, the shaft 6 is configured so as to absorb the vibrations generated by the vibration element to prevent transmission of the vibrations to a device to be driven or the like.

Numeral 8 indicates the rotor as described above. The rotor 8 is subjected to pressuring force produced by a coil spring 4 and thereby is in pressure contact with the vicinity of the outer peripheral portion of the flange-shaped elastic member 5. This rotor 8 can be disposed on the outer periphery of the elastic member 1 and therefore is advantageous in reducing the shaft length and the size of the motor accordingly. Numeral 9 denotes an output gear that rotates together with the rotor and transmits output to the device to be driven, and numeral 10 indicates a ball bearing for supporting the output gear.

For convenience, in the descriptions of the first embodiment and the second to tenth embodiments described later, the side on which the rotor and the first elastic member are located and the side on which the second elastic member is located in the axial direction of the vibration element are referred to as an "upper side" and a "lower side", respectively, with the flange-shaped elastic member taken as a boundary therebetween.

In the present embodiment, with the flange-shaped elastic member 5 taken as a boundary between the upper and lower sides, the first elastic member 1 located on the upper side has a smaller diameter, and the piezoelectric element 3 and the second elastic member 2 that are located on the lower side have larger diameters. Thus, the vibration element is constructed such that with the flange-shaped elastic member 5 taken as a boundary between the upper and lower sides, the stiffness against vibration of a portion (a lower portion) of the vibration element provided with the second elastic member 2 that is located on the lower side is higher than that of a portion (an upper portion) of the vibration element provided with the first elastic member 1 that is located on the upper side, and thereby the upper and lower portions arranged with the flange-shaped elastic member 5 taken as a boundary therebetween are considerably different in dynamic stiffness from each other.

As described above, when the vibration element is formed to be asymmetrical with respect to the flange-shaped elastic member 5 with the upper and lower portions arranged in the axial direction by providing different outer diameters from each other, two kinds of primary bending vibration modes can be obtained, for example, on a plane parallel to the paper face as indicated in the vibration mode diagrams (showing a distribution of radial displacements in the axis part) shown in FIGS. 1B and 1C. Specifically, with the flange-shaped elastic member 5 interposed between the upper and lower portions of the vibration element, the lower portion is displaced considerably large in the case of the vibration mode shown in FIG. 1B, while the upper portion is displaced considerably large in the case of the vibration mode shown in FIG. 1C. In other words, even when the bending vibrations are generated in the same displacement direction, it is possible to excite two vibration modes that are totally different in relative ratio between displacements of the respective ends of the vibration element.

The value of natural frequency of the vibration mode shown in FIG. 1C is smaller than that of the vibration mode shown in FIG. 1B, and the natural frequencies in the vibration modes shown in FIGS. 1B and 1C are considerably different from each other. This is because the vibration mode shown in FIG. 1B mainly is adjusted for the second elastic member 2 having a larger outer diameter, while the vibration mode shown in FIG. 1C mainly is adjusted for the first elastic member 1 having a smaller outer diameter.

The increase in outer diameter of the second elastic member 2 allows sufficiently high mass to be secured even when the second elastic member 2 is shortened in the axial direction. In other words, the increase in outer diameter of the second elastic member 2 allows the second elastic member 2 to be shortened in the axial direction, and thereby a vibration element with a low natural frequency can be structured.

As can be seen from FIG. 1B, when the upper aid lower portions arranged in the axial direction with the flange-shaped elastic member 5 interposed therebetween are made considerably different in dynamic stiffness from each other, the displacement caused by bending vibrations generated in the vicinity of the flange-shaped elastic member 5 is small. Hence, when the piezoelectric element 3 is disposed in the vicinity of the flange-shaped elastic member, the distortion of the piezoelectric element 3 can be suppressed to a low level and thus a bar-shaped vibration element can be provided that has a small internal loss and high energy efficiency.

Figure 11A:
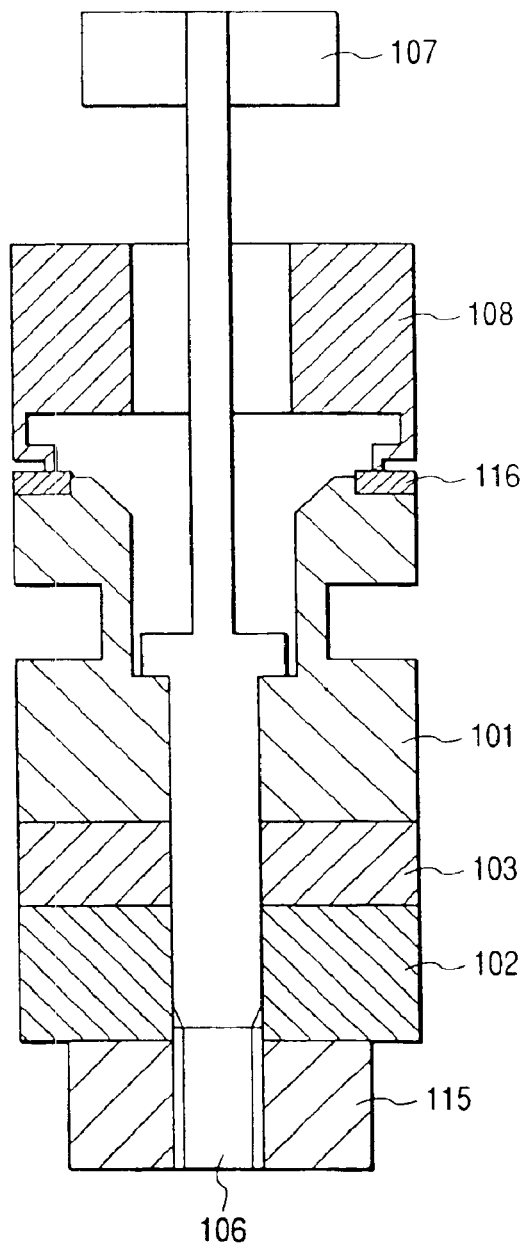
FIG. 11A is a cross-sectional view of a conventional vibration wave motor and FIG. 11B shows a vibration mode of its vibration element.
Figure 11B:
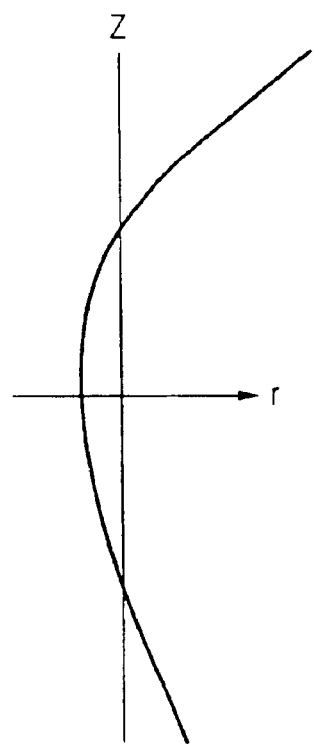
Figure 12:
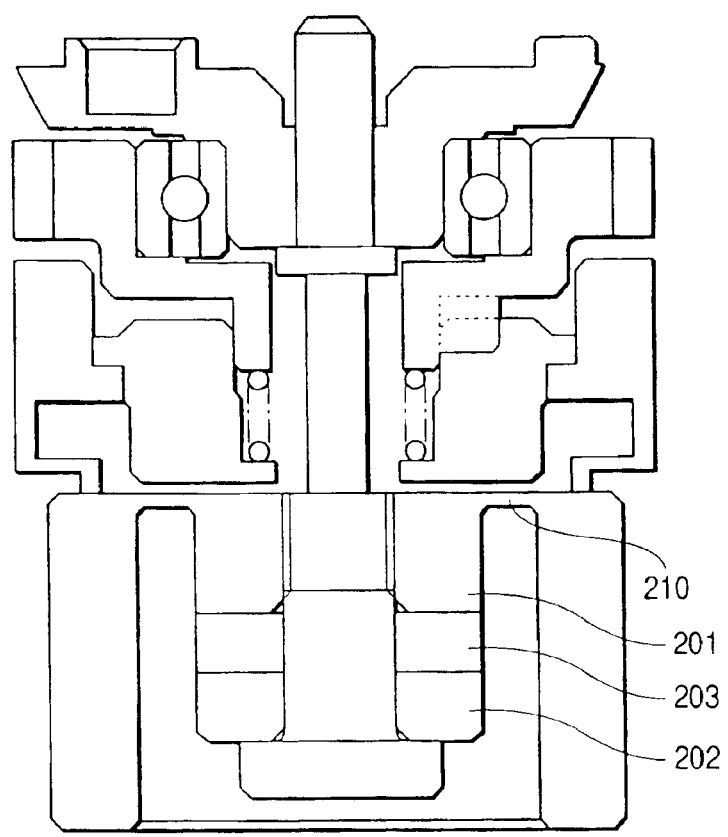
FIG. 12 is a cross-sectional view of a conventional vibration wave motor.

The bar-shaped vibration element shown in, for example, FIG. 11A or FIG. 12 that is not provided with the flange-shaped elastic element 5 having a larger outer diameter than those of members adjacent thereto does not produce two different bending vibration modes. Furthermore, as shown in FIG. 13, even with the structure having a flange-shaped elastic element 305, when a portion located on the upper side including a first elastic member 301 and a portion located on the lower side including a second elastic member 302 and a piezoelectric element 303, which are arranged with the flange-shaped elastic member 305 interposed therebetween, are formed to be identical or similar in shape to each other, it is not possible to excite two vibration modes that are totally different in relative ratio between displacements of the respective ends of the vibration element.

Figure 13:
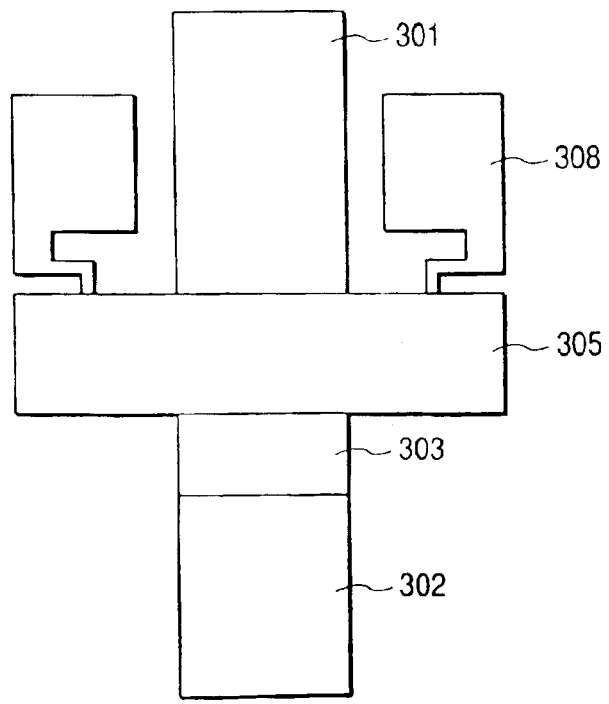
FIG. 13 is a drawing showing a vibration element whose upper and lower portions are substantially symmetrical to each other with respect to a flange-shaped elastic member interposed therebetween.

The bar-shaped vibration element shown in FIG. 13 can provide the same effect as that obtained by the bar-shaped vibration element shown in FIG. 1A in the point that a rotor 308 can be disposed on the outer periphery of the elastic member 301. However, the bar-shaped vibration element shown in FIG. 13 merely generates only one bending vibration mode or two bending vibration modes that have little difference from each other and thus produces a bending vibration mode causing great change in displacement of the vicinity of the piezoelectric element 303 and the flange-shaped elastic member 305. As a result, an excessive distortion is caused in the piezoelectric element 303 and thereby the internal loss in the piezoelectric element 303 cannot be suppressed. Thus, a vibration element with low energy efficiency results.

On the contrary, in the case of the vibration element shown in FIG. 1A according to the present embodiment, the size of the vibration type driving apparatus is reduced with the rotor 8 disposed around the first elastic member 1 and a vibration element can be provided that has high driving efficiency and an energy loss thereinside is suppressed to be small.

Furthermore, if the protruding flange-shaped elastic member 5 is formed of a metal, even in the case where distortion concentrates on the protruding flange-shaped elastic member 5, the increase in internal loss stays within a minimum range since damping characteristic of the metallic material is better than that of the piezoelectric element and thus a short vibration element with high efficiency can be obtained.

When the vibration element is configured to have a larger size, it is possible to augment the vibration displacement. In this case, therefore, torque required for driving can be produced relatively easily although the loss of vibration energy inside the vibration element may be somewhat greater. However, when the vibration element is configured to have a smaller size, the vibration displacement cannot be augmented much. Consequently, it is an important matter for securing sufficiently high driving torque that the loss of vibration energy inside the vibration element is suppressed to be small.

It is possible to selectively produce the vibration modes indicated in FIGS. 1B and 1C by selectively applying alternating signals substantially corresponding to the natural frequencies of the vibration modes indicated in FIGS. 1B and 1C, respectively, to the piezoelectric element 3. Hence, if the first elastic member 1 located on the upper side of the flange-shaped elastic member is formed of a, metal causing less internal damping or the like, a high-efficiency vibration element causing less vibration damping can be obtained when the vibration mode indicated in FIG. 1C is produced in which vibration displacement of the first elastic member 1 is greater.

In addition, the natural frequency of the vibration mode indicated in FIG. 1C is affected by the dynamic stiffness of the first elastic member 1 considerably. Hence, when the first elastic member 1 is formed to be considerably thin, the drive frequency can be lowered, and it is not increased even if the shaft length is reduced.

Moreover, when the outer diameter of the flange-shaped elastic member, i.e. the diameter of its surface that is in contact with the rotor is increased in accordance with driving force that can be produced by the piezoelectric element 3 disposed on the lower side of the flange-shaped elastic member, the driving torque can be increased even when the shaft length of the vibration element is reduced.

In the present embodiment, the first and second elastic members 1 and 2 are made different in outer diameter from each other so that the vibration element is obtained with its upper and lower portions, which are arranged with the flange-shaped elastic member 5 interposed therebetween, being different in dynamic stiffness from each other. However, the vibration element may be constructed with the first and second elastic members 1 and 2 formed of different materials. When the second elastic member 2 is formed of a material with higher stiffness than that of the first elastic member 1, similar vibration modes to those indicated in FIGS. 1B and 1C can be obtained.

Second Embodiment

FIGS. 2A to 2C show a second embodiment of the present invention; FIG. 2A is a cross-sectional view of a vibration element, and FIGS. 2B and 2C show bending vibration modes of this vibration element.

The following description is centered on the respects that are different as compared to the vibration element shown in FIG. 1A.

Numeral 11 indicates a first elastic member that is formed integrally with a flange-shaped (disc-shaped) elastic member 15 extending in the direction orthogonal to the axial direction of the vibration element. Numeral 12 denotes a second elastic member that passes through the center portions of a piezoelectric element 13 and the first elastic member 11 and also serves as a shaft member for supporting the vibration element. The end portion of the second elastic member 12 located on the upper side is fixed to a mass member 17, and a threaded portion 12b provided in the shaft part is screwed together with the first elastic member 11. Thus, the piezoelectric element 13 is sandwiched between and fixed with the first elastic member 11 and the second elastic member 12.

In the vibration element shown in FIG. 2A, the outer diameters of an upper end portion of the first elastic member 11 and a lower end portion 12a of the second elastic member 12 are increased and thereby mass of the free ends with higher bending vibration displacement is increased, and thus the natural frequency of the vibration element is reduced. Since the natural frequency can be reduced, a vibration element can be provided that is smaller in size when one has a natural frequency being equal to that of the vibration element.

Similarly in the present embodiment, the outer diameter of the portion of the second elastic member 12 located below the flange-shaped elastic portion 15 is set to be larger than that of the portion of the first elastic member 11 located above the flange-shaped elastic portion 15, and thereby the above-mentioned portions are made different in dynamic stiffness from each other, so that two different bending vibration modes can be excited.

A rotor is disposed on the outer periphery side of the first elastic member 11 although it is not shown in the figure. In the present embodiment, a frictional member 51 with abrasion resistance is attached to the surface of the disc-shaped elastic portion 15 that comes into contact with the rotor. In the vibration element shown in FIG. 1A, since the flange-shaped elastic member 5 comes into contact with the rotor 8, the surface of the flange-shaped elastic member 5 is required to be subjected to surfacing process using a lap or the like. In the present embodiment, however, since the frictional member 51 is provided, it is no longer necessary to carry out the surfacing process with respect to the surface of the disc-shaped elastic portion 15.

Third Embodiment

FIG. 3 is a cross-sectional view of a vibration element of a vibration wave motor showing a third embodiment.

Similarly, in the present embodiment, the description is centered on points differing from the vibration element shown in FIG. 1A.

Numeral 21 denotes a first elastic member, numeral 22 a second elastic member, numeral 23 a piezoelectric element, and numeral 25 a flange-shaped (disc-shaped) elastic member extending in the direction orthogonal to the axial direction of the vibration element. The first elastic member 21 includes a shaft portion passing through the second elastic member 22, the piezoelectric element 23, and the flange-shaped elastic member 25. The end of the shaft portion is fixed to a mass member 27 below the second elastic member 22. Thus, the first elastic member 21 supports the whole vibration element. This shaft portion includes a threaded portion 21b and a flange portion 21c. The second elastic member 22 is screwed together with the threaded portion 21b and thereby the flange-shaped elastic member 25 and the piezoelectric element 23 are sandwiched between and fixed with the second elastic member 22 and the flange portion 21c.

A rotor is disposed on the outer periphery side of an end portion 21a and the flange portion 21c of the first elastic member 21 although it is not shown in the figure.

Similarly, in the present embodiment, the first elastic member 21 located on the upper side of the flange-shaped elastic member 25 is provided with a portion having a smaller outer diameter than that of the second elastic member 22 located on the lower side of the flange-shaped elastic member 25, and thereby the two elastic members sandwiching the flange-shaped elastic member 25 therebetween are made different in dynamic stiffness. Thus, two different bending vibration modes can be excited as in the vibration elements shown in FIGS. 1A and 2A although they are not shown in the figure.

The first elastic member 21 includes the end portion 21a with an increased outer diameter as in the vibration element shown in FIG. 2A and thereby allows the natural frequency of the vibration element to be reduced.

The flange-shaped elastic member 25 is formed using a material having abrasion resistance and a low vibration damping loss caused by internal distortion, for example, ceramics or hardened stainless steel. In the flange-shaped elastic member 25, a frictional surface 25a that comes into contact with the rotor and surfaces 25b and 25c by which the flange-shaped elastic member 25 is sandwiched are formed to protrude slightly to allow a period of time required for the surfacing process using a lap to be shorter. The frictional surface 25a and the surface 25c for sandwiching are present in the same plane so as to be lapped simultaneously.

Fourth Embodiment

Figure 4:
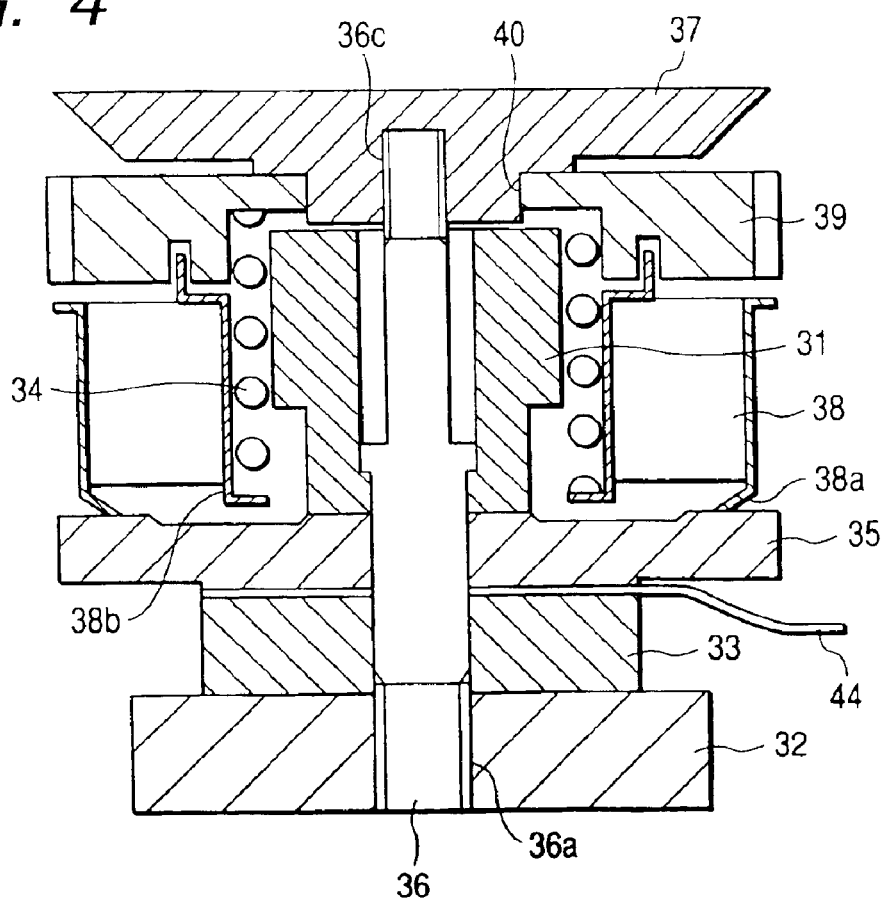
FIG. 4 is a cross-sectional view of a vibration wave motor according to a fourth embodiment of the present invention.

FIG. 4 is a cross-sectional view of a vibration wave motor showing a fourth embodiment.

Numeral 31 indicates a first elastic member, numeral 32 a second elastic member, numeral 33 a piezoelectric element, and numeral 35 a flange-shaped elastic member extending in the direction orthogonal to the axial direction of a vibration element.

Numeral 36 denotes a shaft that includes a screw 36a for sandwiching and supporting the vibration element that is provided in its lower portion and a joint screw 36c to be joined with a mass member 37 that is provided in its upper portion. A contact spring 38a is secured to the outer periphery of a rotor 38 by adhesion or the like and a spring case 38b is joined with its inner periphery. Numeral 39 indicates an output gear that is engaged and joined with the spring case 38b so as to be prevented from being displaced relative to the spring case 38b in the radial direction. Numeral 34 indicates a coil spring for applying pressure force. A joint part 40 at which the mass member 37 and the gear 39 are joined together is constructed to be a sliding bearing. Numeral 44 denotes a flexible substrate for supplying electricity to the piezoelectric element 33.

The coil spring 34 for applying pressure force is disposed between the lower end of the spring case 38b and the output gear 39, and by the spring force of this spring 34, the spring end of the contact spring 38a fixed to the outer peripheral portion of the rotor 38 is in pressure contact with the upper surface of the disc-shaped elastic member 35. The mass member 37 prevents vibrations from leaking to the outside from the shaft 36.

The first elastic member 31 is formed to have a smaller outer diameter than that of the second elastic member 32.

Similarly in the present embodiment, it is possible to excite two different bending vibration, modes as in the vibration elements shown in FIGS. 1A and 2A.

A driving signal is supplied to the flexible substrate 44 from a driving circuit not shown in the figure. This driving circuit selects a driving vibration for exciting one of the two different bending vibration modes to supply it to the flexible substrate 44.

In the present embodiment, the vibration element is fixed and the rotor as a contact member that is in pressure contact with the vibration element is provided movably. However, the present invention is not limited to this. The contact member may be fixed and the vibration element may be provided movably, and the vibration element and the contact member may be frictionally driven relative to each other by the driving vibration generated in the disc-shaped elastic member protruding in a flange form of the vibration element.

Fifth Embodiment

Figure 5:
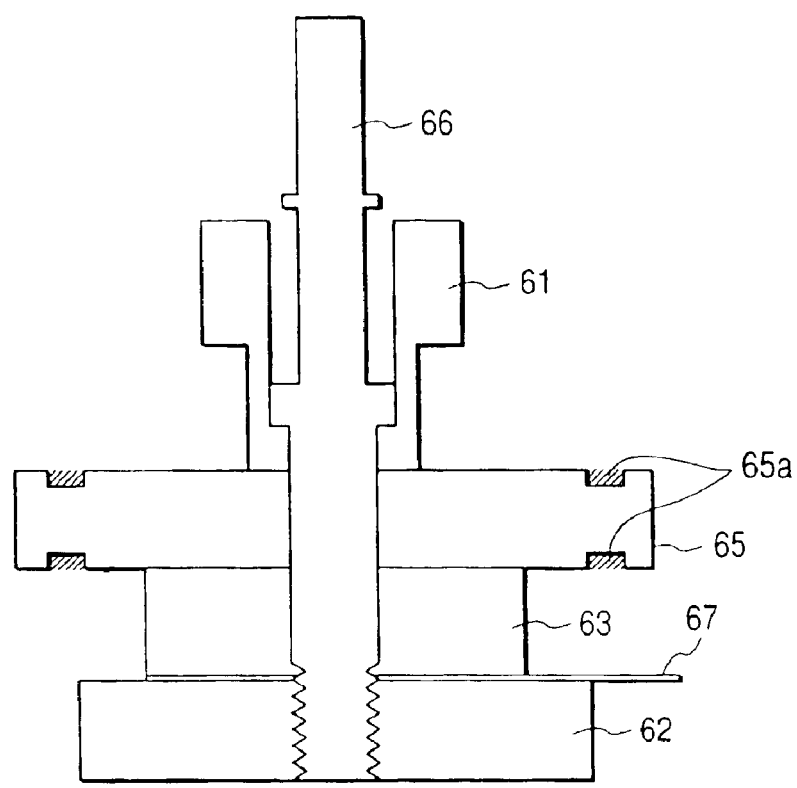
FIG. 5 is a cross-sectional view of a vibration element of a vibration wave motor according to a fifth embodiment of the present invention.

FIG. 5 is a cross-sectional view of a vibration element of a vibration wave driving motor showing a fifth embodiment.

Numeral 61 indicates a first elastic member with a hollow cylindrical shape that is made of a material with a low vibration damping loss such as brass. Numeral 62 denotes a second elastic member with a cylindrical shape that is also made of a material with a low vibration damping loss as in the case of the first elastic member 61. Numeral 65 indicates a flange-shaped (disc-shaped) elastic member extending in the direction orthogonal to the axial direction of the vibration element, and numeral 66 denotes a shaft. The shaft 66 is provided with a threaded portion in its one end. The second elastic member 62 is screwed together with the threaded portion of the shaft 66 and thereby the first elastic member 61, the flange-shaped elastic member 65, and a stacked piezoelectric element 63 are sandwiched between and fixed together with a flange portion of the shaft 66 and the second elastic member 62. This flange-shaped elastic member 65 is formed of a material having abrasion resistance and comes into contact with an unshown rotor by its surface in the vicinity of its outer periphery to rotate and drive the rotor. The frictional surface of the flange-shaped elastic member 65 that comes into contact with the rotor is located on the outer side with respect to the outer peripheries of the first elastic member 61 and the piezoelectric element 63 that are adjacent to the flange-shaped elastic member 65.

In the present embodiment, with the flange-shaped elastic member 65 taken as a boundary between the upper and lower sides, the first elastic member 61 located on the upper side is formed to have a smaller diameter and the piezoelectric element 63 and the second elastic member 62 that are located on the lower side are formed to have larger diameters. Thus, the vibration element is configured such that with the flange-shaped elastic member 65 taken as a boundary between the upper and lower sides, the stiffness against bending vibration of the portion (upper portion) of the vibration element located on the upper side is higher than that of the portion (lower portion) of the vibration element located on the lower side, and thereby the upper and lower portions are considerably different in dynamic stiffness. Hence, even when the bending vibrations are generated in the same displacement direction, it is possible to excite two vibration modes that are totally different in the ratio of relative displacement between the both ends of the vibration element.

Similarly in the vibration element of the present embodiment, the upper and lower portions arranged in the axial direction with the flange-shaped elastic member 65 interposed therebetween are made considerably different in dynamic stiffness from each other, and thereby the displacement caused by bending vibrations generated in the vicinity of the flange-shaped elastic member 65 is reduced. Hence, when the piezoelectric element 63 is disposed in the vicinity of the flange-shaped elastic member, the distortion of the piezoelectric element 63 can be suppressed to a low level and thus a bar-shaped vibration element can be provided that has a small internal loss and high energy efficiency.

Furthermore, the size of a vibration type driving apparatus including the vibration element of the present embodiment can be reduced with a rotor disposed around the first elastic member 61. If the first elastic member 61 is formed of a metal, even in the case where the distortion concentrates on the protruding flange-shaped elastic member 65, the increase in internal loss stays within a minimum range since the damping characteristic of a metallic material is better than that of the piezoelectric element and thus a short vibration element with high efficiency can be obtained.

The vibration element in the present embodiment is provided with concave grooves 65a for augmenting the vibration displacement on the frictional surface of the flange-shaped elastic member 65 that comes into contact with the rotor and the opposite surface to the frictional surface so as to further increase driving torque. The concave groove 65a provided on the frictional surface side is provided on the inner peripheral side with respect to the frictional portion that comes into contact with the rotor. In the present embodiment, the identical grooves 65a are provided on both surfaces of the flange-shaped elastic member 65.

Figure 6:
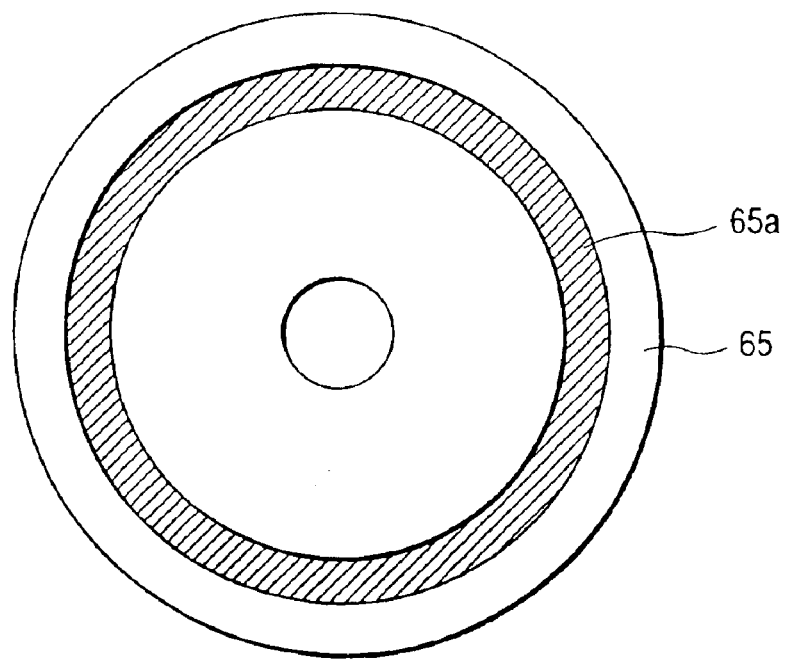
FIG. 6 is a top view of a flange-shaped elastic member shown in FIG. 5.

FIG. 6 is a view of the flange-shaped elastic member 65 shown in FIG. 5, which is viewed from its top. In FIG. 6, the groove 65a is provided in a circular shape concentrically with the flange-shaped elastic member. The concave groove 65a augments out-of-plane displacement caused by the vibrations generated in the outer peripheral portion of the flange-shaped elastic member 65. The groove 65a shown in FIG. 6 has a circular shape. However, the shape of the groove is not limited to this and may be designed with consideration given to the regulation of the natural frequency of the vibration element.

Furthermore, it is necessary to carry out surfacing process by lapping process or the like with respect to the frictional surface of the vibration element on which the rotor frictionally slides. With the groove 65a provided for the frictional surface of the flange-shaped elastic member 65, however, the area to be subjected to the lapping process can be reduced and the lapping process time period is reduced accordingly.

Sixth Embodiment

Figure 7:
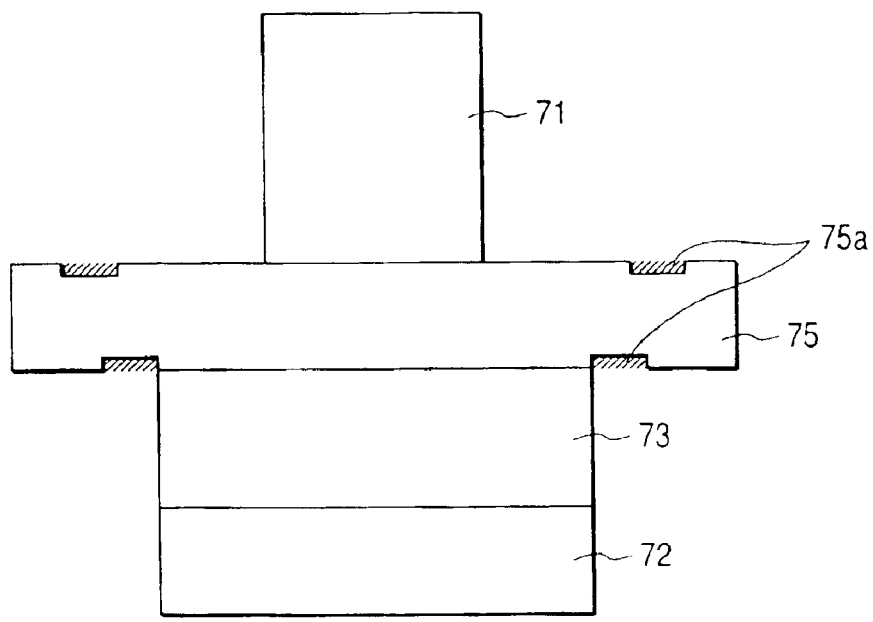
FIG. 7 is a cross-sectional view of a vibration element of a vibration wave motor according to a sixth embodiment of the present invention.

FIG. 7 is a cross-sectional view of a vibration element of a vibration wave driving motor showing a sixth embodiment.

Numeral 71 denotes a first elastic member, numeral 72 a second elastic member, numeral 73 a stacked piezoelectric element, and numeral 75 a flange-shaped elastic member. In this flange-shaped elastic member 75, circular grooves 75a are engraved.

The vibration element is formed to be asymmetric with respect to the flange-shaped elastic member 75. Hence, the distributions of absolute values of distortions caused on the respective surfaces located in the thickness direction of the flange-shaped elastic member 75 are asymmetrical to each other when a driving signal is applied to the vibration element.

In order to augment the out-of-plane displacement at the outer peripheral portion of the flange-shaped elastic member 75 maximally, the grooves 75a are provided at the sites where considerable distortions occur when the vibration mode used for driving is excited. In the vibration element according to the present embodiment, since the distortions occurring when the vibration mode used for driving is excited are caused at its upper and under surfaces asymmetrically to each other, the grooves 75a are also formed on the upper and under surfaces of the flange-shaped elastic member 75 asymmetrically to each other.

These circular grooves 75a also serve for augmenting the out-of-plane displacement of the outer peripheral portion of the flange-shaped elastic member 75 and can shorten the time for lapping process carried out with respect to the flange-shaped elastic member 75.

Figure 8:
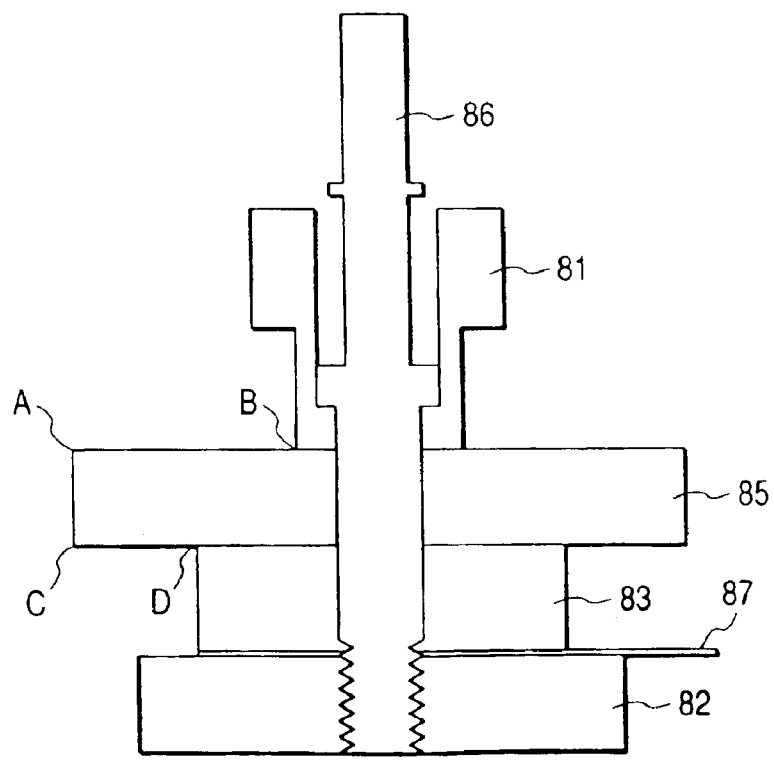
FIG. 8 is a cross-sectional view of a vibration element of a vibration wave motor, which is illustrated for explaining "distortion"
Figure 9:
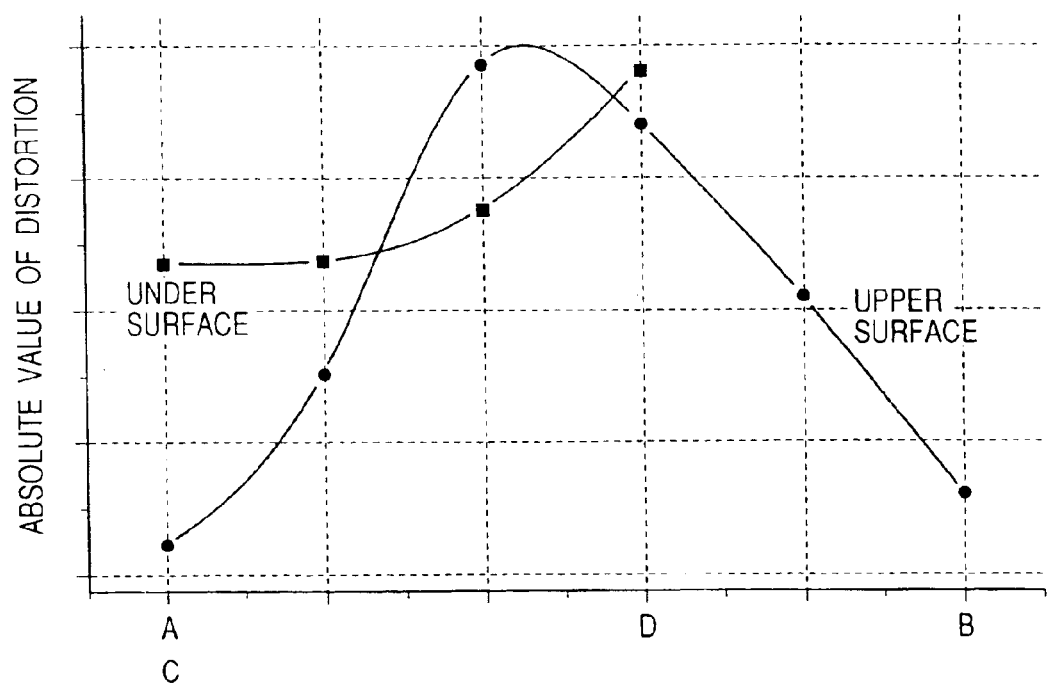
FIG. 9 is a graph showing curves indicating distortions of the vibration element shown in FIG. 8.

A vibration element shown in FIG. 8 is substantially identical to the vibration element shown in FIG. 5 but is different from the one shown in FIG. 5 in that a flange-shaped elastic member 85 is provided with no groove for augmenting out-of-plane displacement. FIG. 9 shows distributions of absolute values of distortions of the flange-shaped elastic member 85 caused when a vibration mode used for driving is excited in the vibration element shown in FIG. 8.

The distributions of absolute values of distortions shown in FIG. 9 are those between points A and B on the upper surface and between points C and D on the under surface of the flange-shaped elastic member 85. As is apparent from FIG. 9, in the vibration element formed to have upper and lower portions arranged in the axial direction that are asymmetrical to each other with the flange-shaped elastic member 85 taken as a boundary therebetween, the sites where the maximum distortion occurs at the upper and under surfaces of the flange-shaped elastic member 85 are different from each other. The distributions of absolute values of distortions vary depending on the shape of the vibration element. Thus, in order to augment the vibration displacement of the frictional surface of the flange-shaped elastic member maximally, it is desirable to suitably provide grooves at locations where the maximum distortion occurs on a flange-shaped elastic member of each vibration element.

Seventh Embodiment

Figure 10:
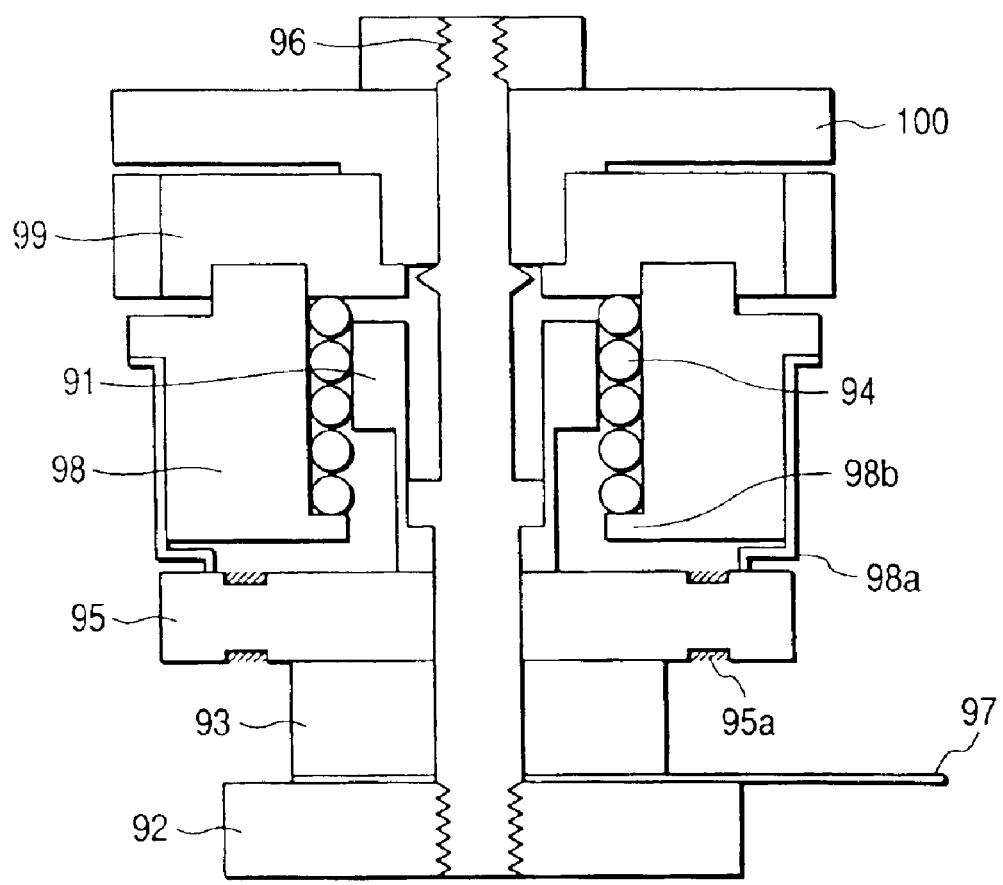
FIG. 10 is a cross-sectional view of a vibration wave motor according to a seventh embodiment of the present invention.

FIG. 10 is a structural view of a vibration wave motor according to a seventh embodiment of the present invention.

Numeral 91 indicates a first elastic member, numeral 92 a second elastic member, numeral 93 a piezoelectric element, and numeral 95 a flange-shaped elastic member extending in the direction orthogonal to the axial direction of a vibration element.

Numeral 96 denotes a shaft. The first elastic member 91, the flange-shaped elastic member 95, and the piezoelectric element 93 are sandwiched and fixed between the second elastic member 92 and a flange portion provided in the middle part of the shaft 96. Numeral 98 indicates a rotor having an outer periphery to which a contact spring 98a is secured by adhesion or the like and an inner periphery with which a spring case 98b is joined. Numeral 99 indicates an output gear that is engaged and joined with the spring case 98b so as to be prevented from being displaced relative to the spring case 98b in the radial direction. Numeral 94 denotes a coil spring for applying pressure force. The spring 94 for applying pressure force is disposed between the output gear 99 and the lower end of the spring case 98b. With the spring force of the spring 94, the spring end of the contact spring 98a fixed to the outer peripheral portion of the rotor 98 is in pressure contact with the upper surface of the disc-shaped elastic member 95. Numeral 100 indicates a flange for fixing a motor that is sandwiched between and fixed with a bolt screwed together with the shaft 96 and a flange portion of the shaft 96. A joint part at which the gear 99 and the flange 100 for fixing a motor are joined together is constructed to be a sliding bearing. Numeral 97 denotes a flexible substrate for supplying electricity to the piezoelectric element 93.

The first elastic member 91 is formed to have a smaller outer diameter than that of the second elastic member 92. Similarly, in the present embodiment, two different bending vibration modes can be excited as in the vibration elements shown in FIGS. 1A and 2A. Circular grooves 95a are provided for upper and under surfaces of the flange-shaped elastic member 95, respectively, and augment the vibration displacement caused in the vicinity of the outer periphery of the flange-shaped elastic member 95.

An unshown driving circuit is connected to the flexible substrate 97. When an alternating voltage having a time phase difference of $\pi/2$ is applied to the piezoelectric element 93 from the driving circuit, the vibration element excites two types of bending vibrations in two directions orthogonal to each other. The composition of the vibrations allows a circular motion to be given to the upper surface of the outer peripheral portion of the flange-shaped elastic member 95 with which the rotor is in contact and thereby the rotor 98 pressed by the flange-shaped elastic member 95 having abrasion resistance is frictionally driven.

As described above, according to the present embodiment, it is possible to construct a vibration element having a shorter length in the axial direction and a low vibration energy loss thereinside and thus a small vibration wave driving apparatus with a low energy loss can be provided.

Since a diameter of the portion site where the vibration element and the rotor are in contact with each other can be set larger, the output characteristics of a low-speed high-torque vibration wave driving apparatus can be exhibited easily. In addition, since the piezoelectric element that is relatively expensive among the components is not required to have a large size, the cost may be reduced.

Furthermore, since the rotor can be disposed on the outer periphery of the protruding elastic member, the overall length of the vibration wave driving apparatus also may be reduced.

Moreover, when the grooves are provided for both surfaces of the flange-shaped elastic member and the out-of-plane displacement in the vicinity of the outer periphery of the flange-shaped elastic member is augmented, the output of the vibration wave motor whose size is reduced in the axial direction may be increased. Particularly, with concave grooves provided at the sites where a considerable distortion is caused by the vibration mode used for driving, it may be possible to increase the output effectively.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A vibration wave driving apparatus comprising:
   a vibration element including a first member joined with an electro-mechanical energy conversion element and a second member, said electro-mechanical energy conversion element being sandwiched between said first member and said second member;

a moving element in contact with a surface of said vibration element; and a supporting member adapted to fix said vibration element to an external apparatus, wherein said first member has a contact portion of a diameter larger than a diameter of said electro-mechanical energy conversion element and a projection portion, wherein said contact portion of said first member contacts said moving element through a surface opposite to the surface with which said electro-mechanical energy conversion element is joined, and the projection portion of said first member is located inside of said moving element, wherein the supporting member passes through the projection portion of said vibration element and inside of said moving element, and wherein when a frequency of an alternating signal which is applied to the electro-mechanical energy conversion element of said vibration element is varied, said vibration element is formed so as to make dynamic stiffnesses different on both sides of a boundary defined by said contact portion, so that a ratio of vibration displacements in the same direction, each of which is generated on one of both ends of said vibration element, is varied.

* * * * *

UNITED STATES PATENT AND TRADEMARK OFFICE
CERTIFICATE OF CORRECTION

| | |
|---|---|
| PATENT NO. | : 6,989,624 B2 |
| APPLICATION NO. | : 10/952762 |
| DATED | : January 24, 2006 |
| INVENTOR(S) | : Takayuki Tsukimoto et al. |

It is certified that error appears in the above-identified patent and that said Letters Patent is hereby corrected as shown below:

ON THE TITLE PAGE
At Item (57), Abstract, lines 1 through 16:
"The present invention relates to a vibration wave driving apparatus includes a vibration element having an electro-mechanical energy conversion element that is disposed between a first elastic member and a second elastic member, characterized in that the vibration element can have a plurality of vibration modes which are different in relative displacement ration between respective ends of the vibration element. Specifically, a third elastic member is disposed between the first elastic member and the second elastic member, and the vibration element is allowed to have two portions which are different in dynamic stiffness from each other and are arranged in the axial direction thereof with the third elastic member interposed therebetween. According to this structure, the length of the vibration wave driving apparatus in the axial direction can be reduced and internal toss of vibration energy can be suppressed to be small."

should read:
--A vibration wave driving element includes a vibration element and a moving element. The vibration element includes a member joined with an electro-mechanical energy conversion element. The moving element is in contact with a surface of the vibration element. The vibration element is in contact with the moving element through the surface opposite to a surface with which the electro-mechanical energy conversion element is joined, and a projection portion inside the moving element is formed on the surface of the vibration element that is in contact with the moving element. When a frequency of alternating signal applied to the electro-mechanical energy conversion element is varied, a ratio of vibration displacements in the same direction, each of which is generated on one of both ends of the vibration element, is varied.--

UNITED STATES PATENT AND TRADEMARK OFFICE
CERTIFICATE OF CORRECTION

PATENT NO. : 6,989,624 B2
APPLICATION NO. : 10/952762
DATED : January 24, 2006
INVENTOR(S) : Takayuki Tsukimoto et al.

It is certified that error appears in the above-identified patent and that said Letters Patent is hereby corrected as shown below:

<u>COLUMN 5</u>
Line 28, "aid" should read --and--.

<u>COLUMN 6</u>
Line 34, "a," should read --a--.

Signed and Sealed this

Third Day of October, 2006

JON W. DUDAS
*Director of the United States Patent and Trademark Office*